United States Patent
Yach

(10) Patent No.: US 8,150,440 B2
(45) Date of Patent: Apr. 3, 2012

(54) SYSTEM AND METHOD FOR REDUCING POWER CONSUMED BY A WIRELESS COMMUNICATION DEVICE

(75) Inventor: David Yach, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1205 days.

(21) Appl. No.: 11/232,952

(22) Filed: Sep. 23, 2005

(65) Prior Publication Data

US 2007/0072565 A1 Mar. 29, 2007

(51) Int. Cl.
*H04B 1/00* (2006.01)
*H04B 7/00* (2006.01)
*H04B 1/38* (2006.01)
*H04B 7/185* (2006.01)

(52) U.S. Cl. ......... 455/522; 455/574; 455/69; 370/318

(58) Field of Classification Search ............. 455/13.4, 455/67.11, 69, 127.1, 574, 522; 370/318
See application file for complete search history.

(56) References Cited

U.S. PATENT DOCUMENTS

| | | | |
|---|---|---|---|
| 5,752,197 A | | 5/1998 | Rautiola et al. |
| 6,625,466 B1 * | | 9/2003 | Dicker et al. ............... 455/522 |
| 6,724,719 B1 | | 4/2004 | Tong et al. |
| 6,839,545 B2 * | | 1/2005 | Riikonen ................ 455/67.11 |
| 6,868,257 B1 | | 3/2005 | Holma |
| 7,218,949 B2 * | | 5/2007 | Koo et al. .................... 455/522 |
| 2004/0132405 A1 * | | 7/2004 | Kitazawa et al. ........... 455/13.4 |
| 2004/0214592 A1 * | | 10/2004 | Zirwas .......................... 455/522 |
| 2005/0020296 A1 * | | 1/2005 | Baker et al. ................. 455/522 |
| 2005/0233704 A1 * | | 10/2005 | Maekawa ..................... 455/69 |
| 2006/0040696 A1 * | | 2/2006 | Lin .............................. 455/522 |
| 2006/0046668 A1 * | | 3/2006 | Uratani et al. ............. 455/127.5 |
| 2007/0249382 A1 * | | 10/2007 | Trachewsky et al. ......... 455/522 |
| 2008/0207251 A1 * | | 8/2008 | Anderson .................... 455/522 |

FOREIGN PATENT DOCUMENTS

EP 0462952 A 12/1991

OTHER PUBLICATIONS

European Search report from corresponding EP application 05108825.0 dated Nov. 11, 2005.

* cited by examiner

*Primary Examiner* — Andrew Wendell
(74) *Attorney, Agent, or Firm* — Gowling Lafleur Henderson LLP

(57) ABSTRACT

A system and method are provided for facilitating reduced power consumption when communicating between a wireless communication device and a wireless communication controller. A power management controller comprising a power saving detection unit and a power level controller is provided. The power savings detector detects when power savings can be applied in accordance with whether or data loss between the base state controller and the wireless communication device can be tolerated. The power level controller selects a reduced transmission power level at which to transmit data if a data loss can be tolerated.

26 Claims, 3 Drawing Sheets

SYSTEM AND METHOD FOR REDUCING POWER CONSUMED BY A WIRELESS COMMUNICATION DEVICE

The invention relates generally to the transmission of data to and from a wireless communication device and specifically for a system and method for reducing power consumed by the device while doing so.

BACKGROUND OF THE INVENTION

Global System for Mobile communication (GSM) is an open, non-proprietary standard for mobile telecommunication. GSM is a digital mobile telephone system that is widely used in over 200 countries. It uses a variation of time division multiple access (TDMA) and is the most widely used of the three digital wireless telephone technologies, TDMA, GSM, and code division multiple access (CDMA). GSM digitizes and compresses data, then transmits it in a channel along with other streams of user data, each in its own time slot. It operates in the 850 MHz, 900 MHz, 1800 MHz and 1900 MHz frequency bands.

One of GSM's strengths is its international roaming capability. This feature provides consumers seamless and standardised same number availability in more than 200 countries. As a result, it is estimated that more than one billion people use GSM phones as of 2005, making GSM the dominant mobile phone system worldwide with a majority of the world's cellular telecommunication market.

General Packet Radio Service (GPRS) is a mobile data service available to users of GSM mobile telephones. GPRS is a packet-switched communication protocol, which means that multiple users can share the same transmitting or receiving channel, only communicating when necessary. Accordingly, the total available bandwidth can be immediately dedicated to those users who are actually transmitting and/or receiving data at any given moment.

With the proliferation of wireless telecommunication devices such as web-enabled cell phones, personal digital assistants (PDAs) and the like, more and more people want to be able to communicate in ways other than the traditional cellular voice telephone call. Accordingly, devices that provide access to Internet browsing, electronic mail (e-mail) communication and instant messaging are gaining in popularity. These added features are examples of mobile data services that require intermittent data transfers, and benefit from sharing the available bandwidth, as provided by GPRS.

However, as people begin to use the additional features provided by their wireless communication devices in addition to voice communication, they will likely see an increase in power consumption, as the devices are being used more frequently. As such, the devices may have to be recharged more frequently. Further, recent trends have been to reduce the overall size of these communication devices. This desire contrasts with the increase in power required by the devices, which will likely require a larger battery to compensate for increased use.

Accordingly, it can be seen that there is a need for a system and method that enables the wireless device to reduce battery consumption.

BRIEF DESCRIPTION OF THE DRAWINGS

Embodiments of the invention will now be described by way of example only with reference to the following drawings in which.

DETAILED DESCRIPTION OF THE PREFERRED EMBODIMENTS

In accordance with an aspect of the present invention there is provided a power management controller for facilitating reduced power consumption when communicating between a wireless communication device and a wireless communication controller, the power management controller comprising: a power savings detector for detecting when power savings can be applied in accordance with whether or not data loss between the wireless communication controller and the wireless communication device can be tolerated; and a power level controller for selecting a reduced transmission power level at which to transmit data if a data loss can be tolerated.

In accordance with a further aspect of the present invention there is provided a method for facilitating reduced power consumption when communicating between a wireless communication device and a wireless communication controller, the method comprising the steps of detecting when power savings can be applied in accordance with whether or not lost data between the wireless communication controller and the wireless communication device can be tolerated; and selecting a reduced transmission power level at which to transmit data if a data loss can be tolerated.

In accordance with yet a further aspect of the present invention there is provided a data storage device comprising instructions which, when executed on a computer, cause the computer to facilitate reduced power consumption when communicating between a wireless communication device and a wireless communication controller by implementing the steps of detecting when power savings can be applied in accordance with whether or not lost data between the wireless communication controller and the wireless communication device can be tolerated; and selecting a reduced transmission power level at which to transmit data if a data loss can be tolerated.

Figure 1:
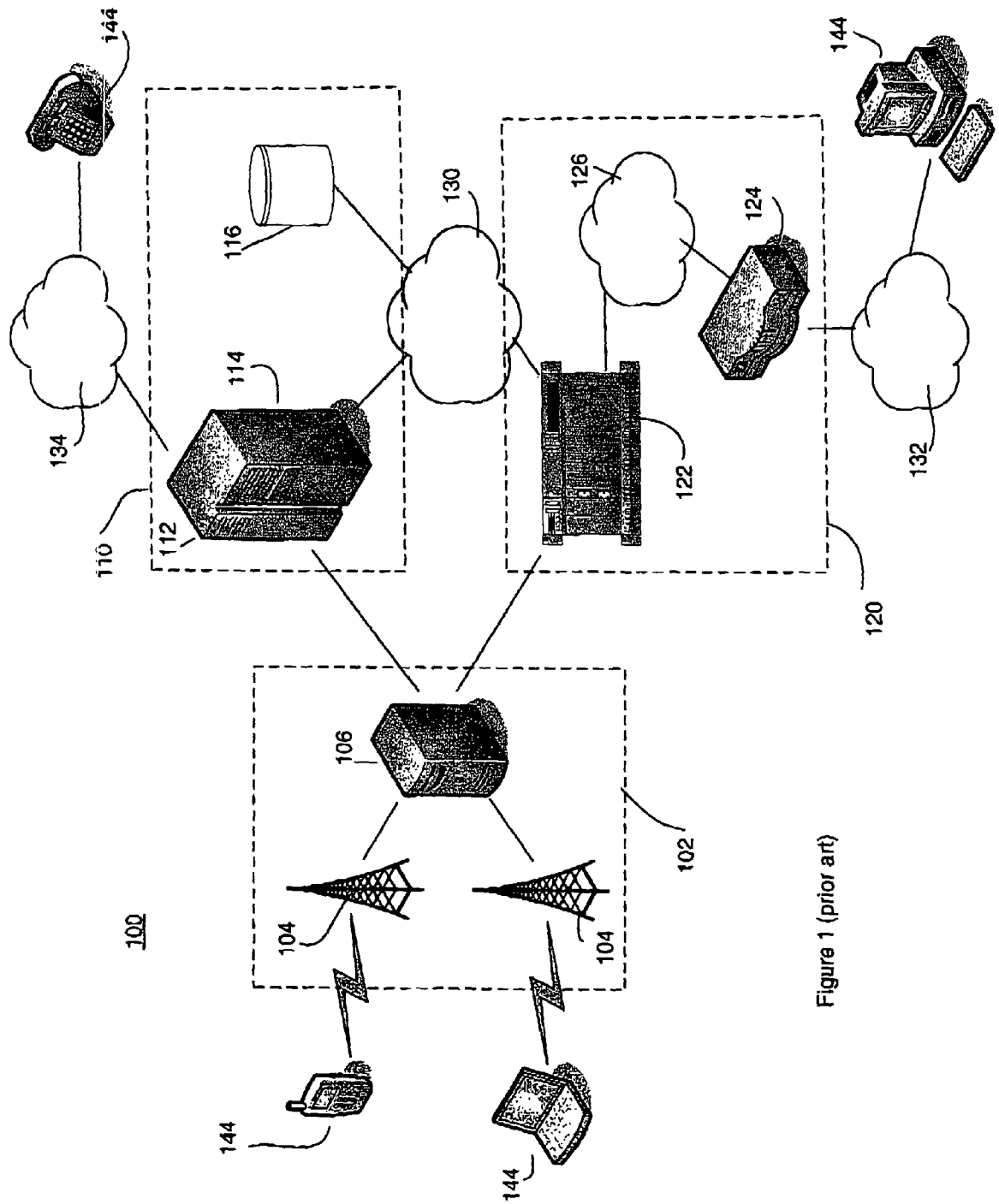
FIG. 1 is a block diagram illustrating a GSM network (prior art)

For convenience, like numerals in the description refer to similar structures in the drawings. Referring to FIG. 1, a standard GSM network architecture is illustrated generally by numeral 100. The GSM network 100 comprises a base station subsystem 102, a network subsystem 110 and a GPRS subsystem 120.

The base station subsystem 102 comprises at least one base transceiver station 104 and a base station controller 106.

The network subsystem comprises a mobile services switching centre 112, a visitor's location register 114 and a home location register 116.

The GPRS subsystem comprises a Serving GPRS Support Node (SGSN) 122, a Gateway GPRS Support Node (GGSN) 124 and a GPRS backbone network 126.

The GPRS subsystem 120 is coupled with the network subsystem 110 via an interface network 130 using a set of digital-telephony protocols. In the present example, the interface network 130 uses the Signalling System 7 (SS7) protocols. The GPRS subsystem 120 is further coupled to computing devices 140 via a communication network 132. The communication network 132 may be a private network such as a corporate intranet or a public network such as the Internet, for example. The network subsystem 110 is coupled with telephones 142 via a public switched telephone system (PSTN) 134, Each of the GPRS subsystem 120 and the network subsystem 110 is connected to the base state subsystem 102 via a dedicated communication link. The base station subsystem 102 is coupled to a plurality of different wireless devices (or simply devices) 144 via an over-the-air communication protocol such as Wireless Application Protocol (WAP).

It will be appreciated by a person of ordinary skill in the art that the system shown in FIG. 1 is a general description of a state of the art GSM network, illustrated to provide context for the invention. Accordingly, modifications and variations to the network will be apparent without affecting the scope of the invention.

The base station controller 106 provides the intelligence behind the base transmission stations 104. Typically, a base station controller 106 has tens or even hundreds of base transmission stations 104 under its control. The base station controller 106 handles allocation of radio channels, sets the power transmission requirements for the communication device, receives measurements from the communication device and controls handovers from base transmission station 104 to base transmission station 104 as the communication device moves there between.

In accordance with GSM standards, power control from the base station controller 106 to the device 144 is designed to keep a continuous circuit-switched conversation going. Generally, higher transmission power levels at the device 144 will result in fewer errors and/or dropped packets transmitted from the device 144 to the base station controller 106 than lower transmission power levels. If an error is not correctable or the data is not received at all, the base controller station 106 has to retransmit the data. Each retransmission is referred to as a retry.

In order to maintain a continuous circuit-switched conversation, the timing parameters do not allow for retries, so the base station controller 106 needs to get all or most of the data in one attempt. Accordingly, the transmission power level of the device 144 needs to be set sufficiently high. This requirement is one factor that enables a person to engage in a cellular conversation using the device 144 and experience minimal delays or dropped data.

Accordingly, since GPRS is built on top of GSM, the power requirements are carried forward to the GPRS requirements. This model works fairly well in a data environment that requires a fast or immediate exchange of data. For example, in a pull-based data environment such as web browsing or other web-based application it is desirable to minimize the number of retries, as the user generally does not want to wait for retries to occur.

However, in a sporadic communication environment, retries are acceptable as long as they do not occur too frequently. For example, data communication such as electronic mail (email) exchange can often afford the delays caused by retries due to lost packets. This may be true for both a pull-based data environment, wherein the device 144 periodically polls for email messages, and a push-based data environment, wherein email messages are pushed to the device 144 without it having to make a request for information.

As in a standard GSM/GPRS implementation, the base station controller 106 is responsible for indicating the power the device is to use for transmission. Accordingly, in the present embodiment, the base station controller 106 is provided with a power management controller (not shown).

Figure 2:
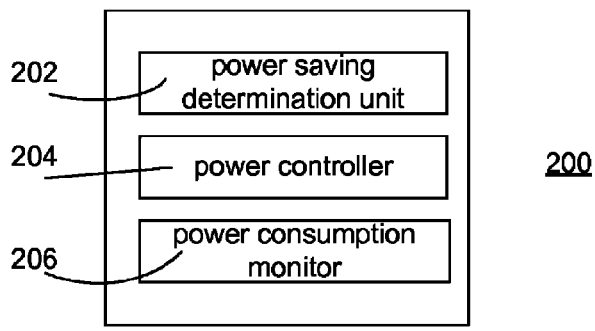
FIG. 2 is a block diagram illustrating a power management controller.

Referring to FIG. 2, the power management controller is illustrated generally by numeral 200. The power management controller 200 includes a power saving determination unit 202, a power controller 204 and a power consumption monitor 206.

The power saving determination unit 202 determines whether or not the data exchange between the base station controller 106 and the device 144 can afford delays and the power level controller 204 determines the transmission power accordingly. The device 144 then uses the determined transmission power for communicating with the base station controller 106.

In the present embodiment, the power management controller 200 is implemented in software and executed by the base station controller 106. The power management controller 200 determines whether or not the power required for the retries exceeds the power saved by using the lower transmission power and makes adjustments if necessary.

Figure 3:
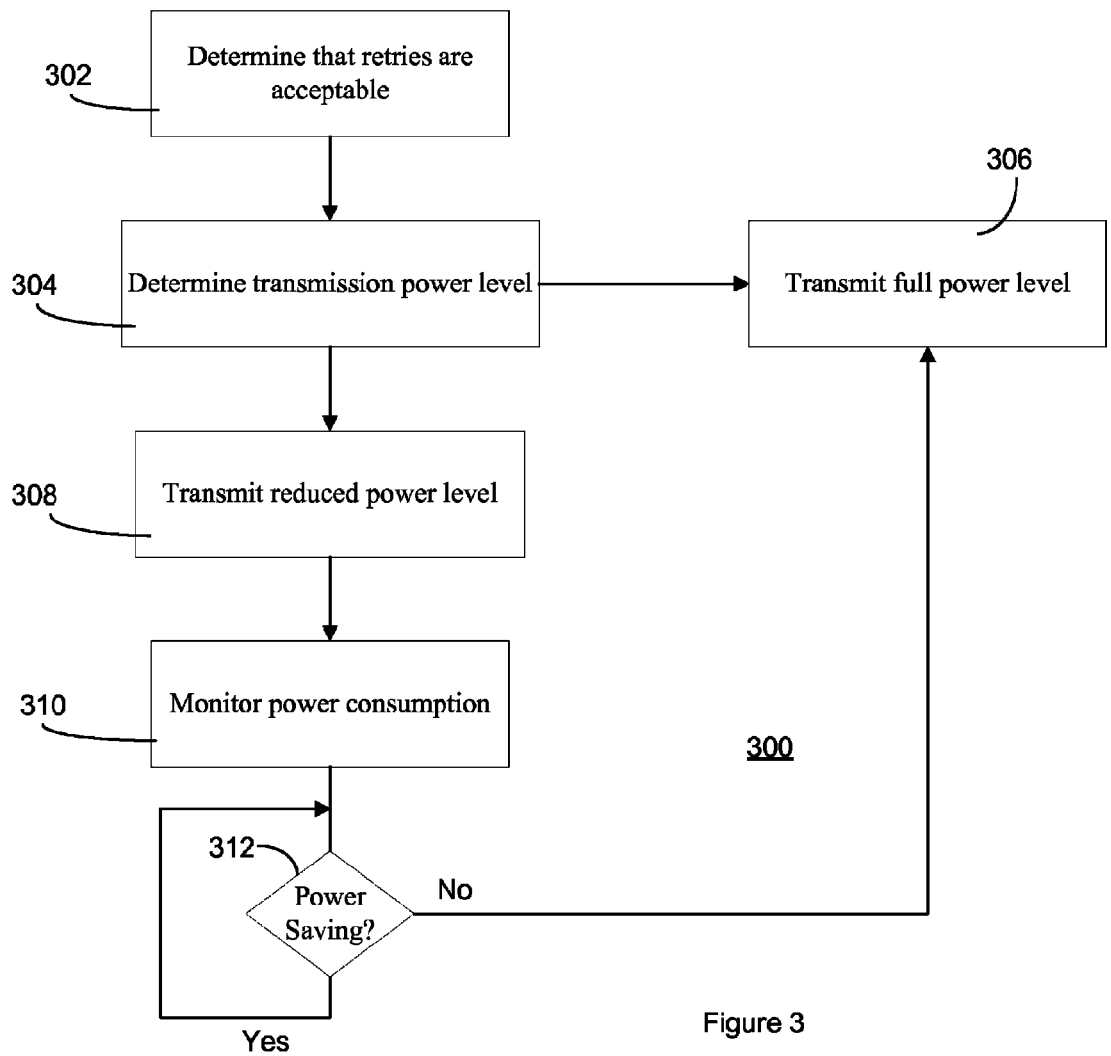
FIG. 3 is a flow chart illustrating the operation of an embodiment of the invention.

Referring to FIG. 3, a flow chart illustrating operation of an embodiment of the invention is illustrated generally by numeral 300. In step 302, the power saving determination unit 202 determines whether or not an application operating on the device 144 and transmitting data requires minimal transmission interruptions or if it can accept delays for retries. This step can be implemented a number of different ways. In one example, the power management controller 200 includes a list of applications and associated flags signalling whether or not the application can accept delays. When the device 144 transmits data, it initially indicates which application is in use. The power saving determination unit 202 uses this application identifier to parse the list of applications and determine whether or not the application can accept delays due to retries.

In another example, the device 144 itself includes a list of applications and associated flags signalling whether or not the application can accept delays. When the device 144 transmits data, it initially indicates whether or not the application in use can accept delays.

In yet another example, the application 144 includes information regarding whether or not delays are acceptable. When the device 144 transmits data, it initially indicates whether or not the application in use can accept delays.

It will be appreciated that other schemes for performing his step may be implemented, or a combination thereof, to achieve the desired result.

In step 304, the power level controller 204 determines the device's transmission power level based upon whether the device can tolerate delays due to retries. If the device cannot tolerate the delays, the transmission power level is determined as is standard in the art and operation continues at step 306. At step. 306, a standard transmission power level is communicated to the device 144 and the operation continues as is standard in the art. The standard transmission power level is the transmission power level that would be determined in accordance with the transmission standard being used, which, in the present embodiment, is GPRS.

Returning to step 304, if the device 144 can tolerate delays due to retries, a reduced transmission power level is determined. It will be appreciated that different power reductions may be experimented with to determine an optimal reduced transmission power level. Further, it will be appreciated that not every base station controller 106 needs to have an equivalent power reduction.

The operation continues at step 308, where the transmission power level is communicated to the device 144, which uses the reduced power transmission level to communicate with the base station controller 106.

In step 310, the power consumption monitor 206 monitors the communication between the base station controller 106 and the device 144 for dropped packets and number of retries.

Although the device 144 transmits at a lower power level, each retry consumes power. If too many retries are necessary, the power savings realized by the lower power transmission level may be negated or even reversed by sitting the extra messages.

Accordingly, in step 312, the power consumption monitor 206, either continuously or at periodic intervals, calculates an estimated power savings. It is anticipated that in many cases, the number of retries will be sufficiently low such that an overall power saving will be realized and the operation stays at step 312 until the communication is complete.

However, if the lower transmission level does not result in an overall power savings the operation proceeds to step 306. In step 306, the power level controller 204 transmits the standard transmission power level to the device 144. The device 144 then uses the standard transmission power level for the remainder of the communication.

Accordingly, it will be appreciated that the present embodiment may provide a power saving at the device 144. The realized power saving can be exploited to provide longer battery life to the device 144 or facilitate a reduction of the battery size in order to allow for a smaller device form factor.

Figure 4:
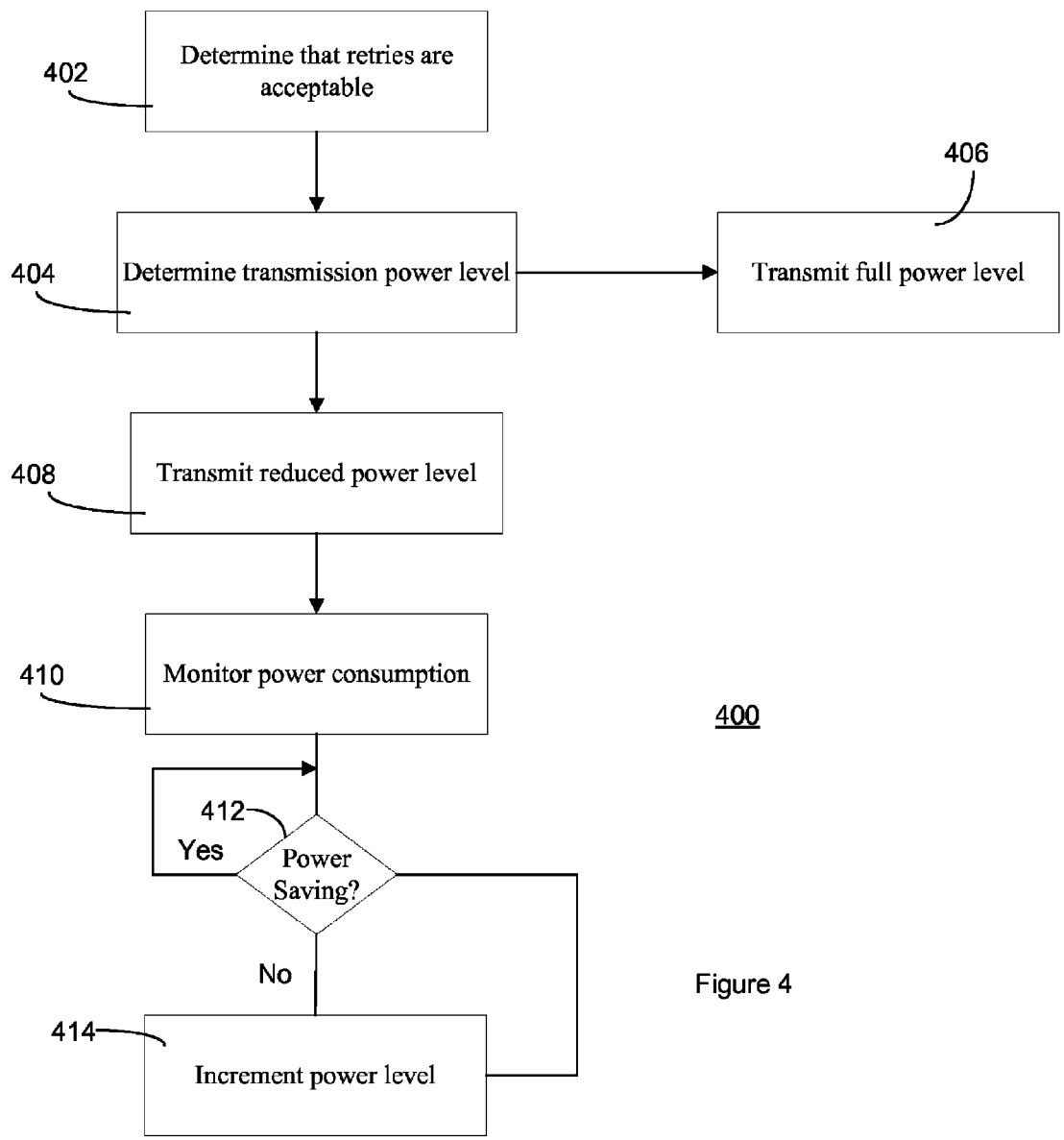
FIG. 4 is a flow chart illustrating the operation of an alternate embodiment of the invention to that shown in FIG. 3.

Referring to FIG. 4, a flow chart illustrating operation of an alternate embodiment of the invention is illustrated generally by numeral 400. In the previous embodiment, only two power levels were described; a reduced transmission power level and a standard transmission power level. In the present embodiment, however, multiple power levels are available for further facilitating power savings.

In step 402, the power saving determination unit 202 determines whether or not the application transmitting data requires minimal transmission interruptions or if it can accept delays for retries. Similar to the previous embodiment, this step can be implemented a number of different ways.

In step 404, the power level controller 204 determines the device transmission power level. If the application cannot tolerate delays due to retries, the transmission power level is determined as is standard in the art and operation continues at step 406. At step 406, the standard transmission power level is communicated to the device 144 and the operation continues as is standard in the art.

Returning to step 404, if the device 144 can tolerate delays due to retries, a reduced, lowest transmission power is determined. Similar to the previous embodiment, it will be appreciated that different power reductions may be experimented with to determine an optimal lowest transmission power level.

The operation continues at step 408, where the transmission power level is communicated to the device 144, which uses the transmission power level to communicate with the base station controller 106.

In step 410, the power consumption monitor 204 monitors the communication between the base station controller 106 and the device 144 for dropped packets and number of retries. As previously described, although the device 144 transmits at a lower power level, each retry consumes power. If too many retries are necessary, the power savings realized by the lower power transmit level may be negated or even reversed by transmitting the extra messages.

Accordingly, in step 412, the power consumption monitor 204, either continuously or at periodic intervals, calculates an estimated power consumption. If the power consumption results in an overall power saving, the transmission power level is maintained until the transmission is complete.

However, if the transmission power level does not result in an overall power savings the operation proceeds to step 414. In step 414, the power level controller 204 increments the transmission power level to the next lowest transmission power level and transmits it to the device 144. The device 144 then uses this transmission power level for the communication and the operation returns to step 412. In this manner, the transmission power level can be incremented, if necessary, until the standard transmission power level is reached.

Accordingly, it will be appreciated that this embodiment may allow for greater power savings in certain circumstances such as, for example, where the lowest transmission power level is slightly below the transmission power level required to operate efficiently.

Although the above-description refers generally to a pull based data environment as requiring little or no delay and a push based data environment as capable of affording a delay, it need not be the case. It will be apparent that an application in a pull based data environment can afford delays and an application in a push based data environment may require little delay. Accordingly, in an alternate embodiment, applications are assigned a Quality of Service (QoS). The power transmission level of the device 144 for the application can then be determined in accordance with the application's QoS. For example, for an application with a high QoS, the device can be assigned the standard transmission power level. For an application with a low QoS, the device can be assigned the lowest or other reduced transmission power level.

Further, in the embodiments described above, the power management controller is implemented in software. However, the power management controller may be implemented in hardware without affecting the scope of the invention.

Yet further, in the embodiments described above the base station controller 106 assigns the transmission power level. It will be appreciated that this implementation is selected to easily integrate with the existing standard However, the transmission power level may be determined at the device 144 instead of the base station controller 106.

Yet further, the previous embodiments describe that if the reduced transmission power levels fail to provide a power savings, the standard transmission level is used for the remainder of the communication. However, it will be apparent that the reduced transmission power level transmission may be retried upon a predetermined event such as an elapsed time or a change in base transmission station 104, for example, before the communication is complete.

Yet further, in addition to determining whether or not the application can tolerate delays due to dropped packets, the base station controller 106 also examines its current network utilization and capacity. Therefore, for example, even though an application may be able to tolerate dropped packets, the reduced power transmission level may not be used if the system is running at, or near, capacity. The reason for this is the extra bandwidth that may be required by retries would put an unnecessary strain on the system.

Yet further, the previous embodiments describe applications that can deal with some degree of packet loss by retries, which results in delays. However, other applications are able to tolerate the packet loss by ignoring the data. An example of such an application is a head to head action game between two mobile devices. In such an example, it will likely be possible to ignore a lost packet and update player information when a following packet arrives. It will be appreciated that it may not be necessary to monitor power savings for such applications, as retries are not required. Similarly, the network capacity would not need to be analyzed In the embodiments described above, the standard used for communication is GSM. However, it will be appreciated that the invention may apply across other standards for wireless communication. Accordingly, the term "base station controller" and other GSM-specific terms used herein are not intended to necessarily limit the invention to the GPS standard. Rather, the terms are intended to be understood in their generic sense. For example, the base station controller 106 can be generically represented as a wireless communication controller for controlling one or more cell sites' radio signals.

Other modifications will be apparent to a person of ordinary skill in the art. For example, the dropped packets and number of retries may be monitored at the device 144. As another example, the reduce transmission power level may also be used for base station transmission power.

Although preferred embodiments of the invention have been described herein, it will be understood by those skilled in the art that variations may be made thereto without departing from the spirit of the invention or the scope of the appended claims.

What is claimed is:

1. A power management controller comprising:
a power saving determination unit determining a second application operating on a wireless device, wherein the wireless device executes a first application tolerating less a transmission interruption and the second application tolerating transmission delay due to dropped packets and retries;
a power level controller in communication with the power saving determination unit, the power level controller examining a current network utilization and capacity, and selecting a reduced transmission power level when the second application is operating on the wireless device and the current network utilization and capacity is not near capacity; and
a power consumption monitor coupled to the power level controller, the power consumption monitor monitoring a power consumption using the reduced transmission power level, and determining if a power saving is realized at the reduced transmission power level and after the retries.

2. The power management controller of claim 1, wherein the power level controller increases the reduced transmission power level if a power saving is not realized.

3. The power management controller of claim 2, wherein the reduced transmission power level is increased to a standard power level.

4. The power management controller of claim 2, wherein the reduced transmission power level is increased incrementally until a power saving is realized or a standard power level is reached.

5. The power management controller of claim 1, wherein the power saving determination unit is further configured to consider network utilization when determining the application operating on the wireless device.

6. The power management controller of claim 1, wherein the power savings determination unit is configured to consult a list when determining application operating on the wireless device.

7. The power management controller of claim 1, wherein the power savings determination unit is implemented at the wireless device and communicates with a data transmitting application when determining the application operating on the wireless device.

8. The power management controller of claim 1, wherein the second application is a General Packet Radio Service (GPRS).

9. The power management controller of claim 1, wherein the power level controller is implemented at the wireless device.

10. The controller of claim 1, wherein the power level controller is implemented at a wireless controller.

11. The power management controller of claim 1, wherein the first application is a circuit switched conversation.

12. The power management controller of claim 1, wherein the power level controller is implemented in software.

13. The power management controller of claim 1, wherein the power level controller is implemented in hardware.

14. The power management controller of claim 1, wherein the wireless communication controller is a base station controller, and the wireless device and the base station controller are configured to communicate over a GSM network.

15. The power management controller of claim 1, wherein the first application is distinct from the second application.

16. A method comprising:
determining a second application operating on a wireless device, wherein the wireless device executes a first application tolerating less a transmission interruption and the second application tolerating transmission delay due to dropped packets and retries;
examining a current network utilization and capacity;
selecting a reduced transmission power level when the second application is operating on the wireless device and the current network utilization and capacity is not near capacity;
monitoring a power consumption using the reduced transmission power level, and
determining if a power saving is realized at the reduced transmission power level and after the retries.

17. The method of claim 16, wherein the second application is a General Packet Radio Service (GPRS).

18. The method of claim 17, further comprising increasing the reduced transmission power level if a power saving is not realized.

19. The method of claim 18, wherein the reduced transmission power level is increased to a standard power level.

20. The method of claim 18, wherein the reduced transmission power level is increased incrementally until a power saving is realized or a standard power level is reached.

21. The method of claim 16, further comprising considering network utilization when determining the application operating on the wireless device.

22. The method of claim 16, wherein the first application is a circuit switched service.

23. The method of claim 16, wherein the wireless device communicates with a data transmitting application when determining the communication service.

24. The method of claim 16, wherein the wireless communication controller receives data from the wireless device for determining selection of the reduced transmission power level.

25. The method of claim 16, wherein the first application is distinct from the second application.

26. A non-volatile data storage device comprising instructions which, when executed on a computer, cause the computer to implement a method of:
determining a second application operating on the wireless device, wherein the wireless device executes a first application tolerating less a transmission interruption and the second application tolerating transmission delay due to dropped packets and retries;
examining a current network utilization and capacity;
selecting a reduced transmission power level when the second application is operating on the wireless device and the current network utilization and capacity is not near capacity;
monitoring a power consumption using the reduced transmission power level, and
determining if a power saving is realized at the reduced transmission power level and after the retries.

* * * * *